United States Patent
Venkatasamy et al.

(10) Patent No.: US 10,141,756 B1
(45) Date of Patent: Nov. 27, 2018

(54) DYNAMIC POWER OPTIMIZATION WHEN TRANSFERRING POWER BETWEEN BATTERIES

(71) Applicant: Amazon Technologies, Inc., Seattle, WA (US)

(72) Inventors: Vidhyananth Ramasamy Venkatasamy, Sunnyvale, CA (US); Sandeep Chidambara Marathe, San Jose, CA (US); Haili Wang, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 15/079,828

(22) Filed: Mar. 24, 2016

(51) Int. Cl.
*H02J 7/00* (2006.01)

(52) U.S. Cl.
CPC ............ *H02J 7/0032* (2013.01); *H02J 7/007* (2013.01); *H02J 7/0045* (2013.01); *H02J 7/0054* (2013.01)

(58) Field of Classification Search
CPC ...... H02J 7/0032; H02J 7/0054; H02J 7/0045; H02J 7/007
See application file for complete search history.

(56) References Cited

U.S. PATENT DOCUMENTS

| | | | |
|---|---|---|---|
| 7,336,978 B2 | 2/2008 | Kim | |
| 7,413,129 B2 | 8/2008 | Fruhauf | |
| 7,893,657 B2 | 2/2011 | Chavakula | |
| 8,180,947 B2 | 3/2012 | Hesse et al. | |
| 8,265,326 B2 * | 9/2012 | Singh | H04M 1/0258 379/433.02 |
| 8,288,997 B2 * | 10/2012 | Choi | B60K 6/28 320/103 |
| 8,359,407 B2 * | 1/2013 | Van Bebber | G06F 1/266 710/10 |
| 8,368,346 B2 * | 2/2013 | Batson | H02J 7/0045 320/103 |
| 8,610,397 B2 | 12/2013 | Purdy et al. | |
| 8,627,121 B2 | 1/2014 | Wu | |
| 8,844,817 B2 * | 9/2014 | Glanzer | G06K 7/082 235/449 |
| 8,853,995 B2 * | 10/2014 | Von Novak | H02J 7/0054 320/103 |
| 8,941,361 B2 * | 1/2015 | Bae | H02J 7/0054 320/103 |
| 9,362,769 B2 * | 6/2016 | Zhou | H01M 10/44 |

(Continued)

OTHER PUBLICATIONS

Simpson, "LM2576, LM3420, LP2951, LP2952 Battery Charging", Texas Instruments, Literature No. SNVAZ557, 19 pages, (2011).

(Continued)

*Primary Examiner* — Naum B Levin
(74) *Attorney, Agent, or Firm* — Pierce Atwood LLP

(57) ABSTRACT

A modular recharging system includes an electronic device that includes an internal battery, and a removable battery pack that the electronic device can use to boost the power of its internal battery. Typically, the battery pack will have a larger battery than the internal battery of the device. Based on threshold charge levels for the internal battery, the electronic device turns on and off power from the battery pack so as to preserve the life of the battery pack. Processor interrupts generated in response to the threshold levels may also be selectively masked to reduce power consumption.

22 Claims, 9 Drawing Sheets

(56) References Cited

U.S. PATENT DOCUMENTS

| | | | | |
|---|---|---|---|---|
| 2004/0246341 | A1* | 12/2004 | Lee | H02J 7/0054 348/207.99 |
| 2007/0080663 | A1* | 4/2007 | Obering | H02J 7/0044 320/114 |
| 2011/0151291 | A1* | 6/2011 | Hoffman | H01M 12/02 429/50 |
| 2012/0212078 | A1* | 8/2012 | Lanni | H02J 1/00 307/151 |
| 2012/0319487 | A1 | 12/2012 | Shah | |
| 2013/0057068 | A1 | 3/2013 | Lin | |
| 2016/0087474 | A1* | 3/2016 | Tallada | H02J 7/0054 320/103 |
| 2016/0185205 | A1* | 6/2016 | Namuduri | B60K 6/28 290/32 |
| 2017/0005489 | A1* | 1/2017 | Kwon | H02J 7/0024 |
| 2017/0063123 | A1* | 3/2017 | Horie | H02J 7/0054 |

OTHER PUBLICATIONS

Taylor et al., "Creating a Universal Car Charger for USB Devices From the TPS54240 and TPS2511", Texas Instruments Application Report, SLVA464E, pp. 1-22, (Sep. 2013).
"Battery chargers in USB OTG devices", Texas Instruments, Literature No. SSZY001, 6 pages, (Jun. 2010).
"USB On-the-Go Basics", Maxim Integrated Products, Inc., Tutorial 1822, Available at: http://www.maximintegrated.com/an1822, 6 pages, (2012).

* cited by examiner

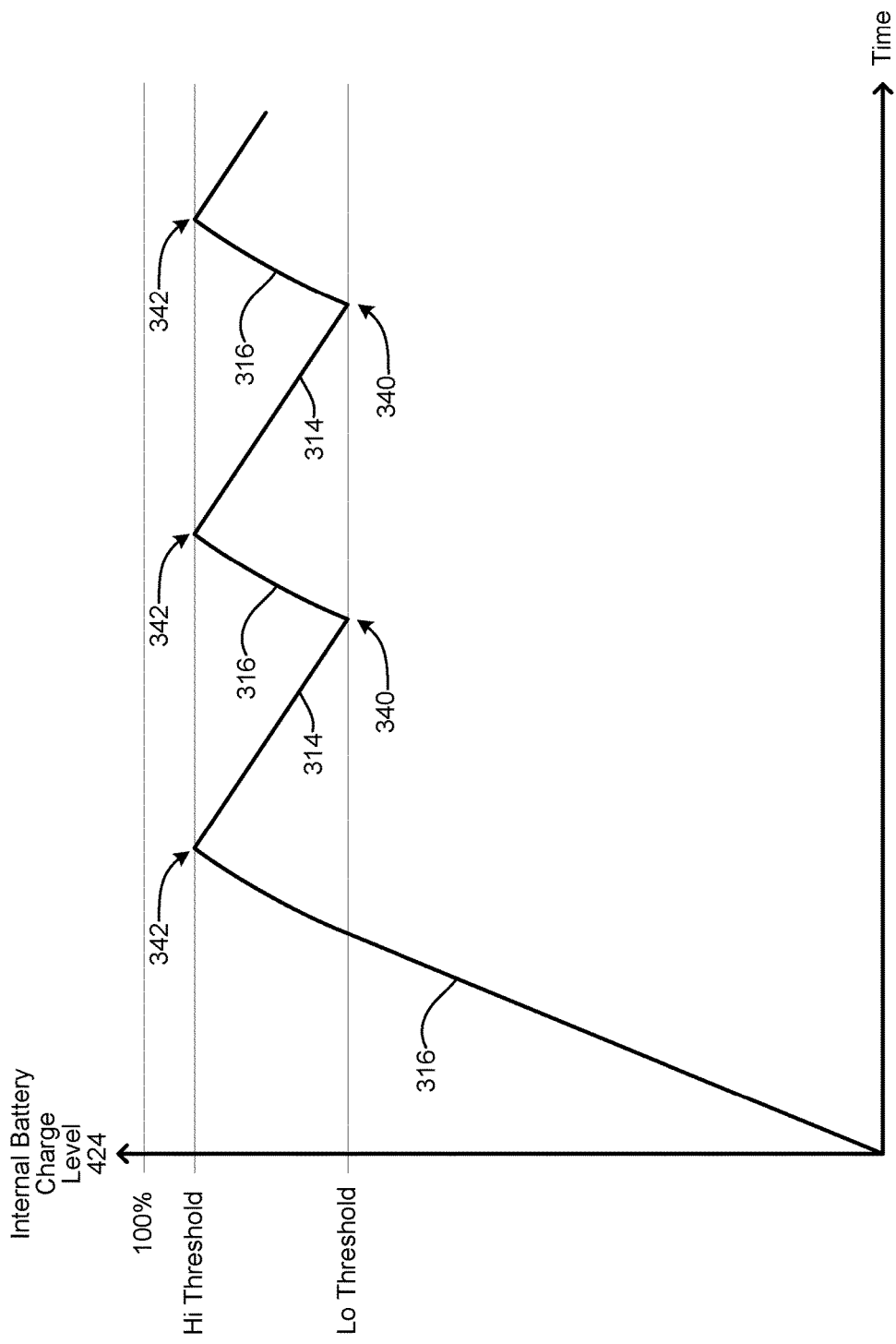

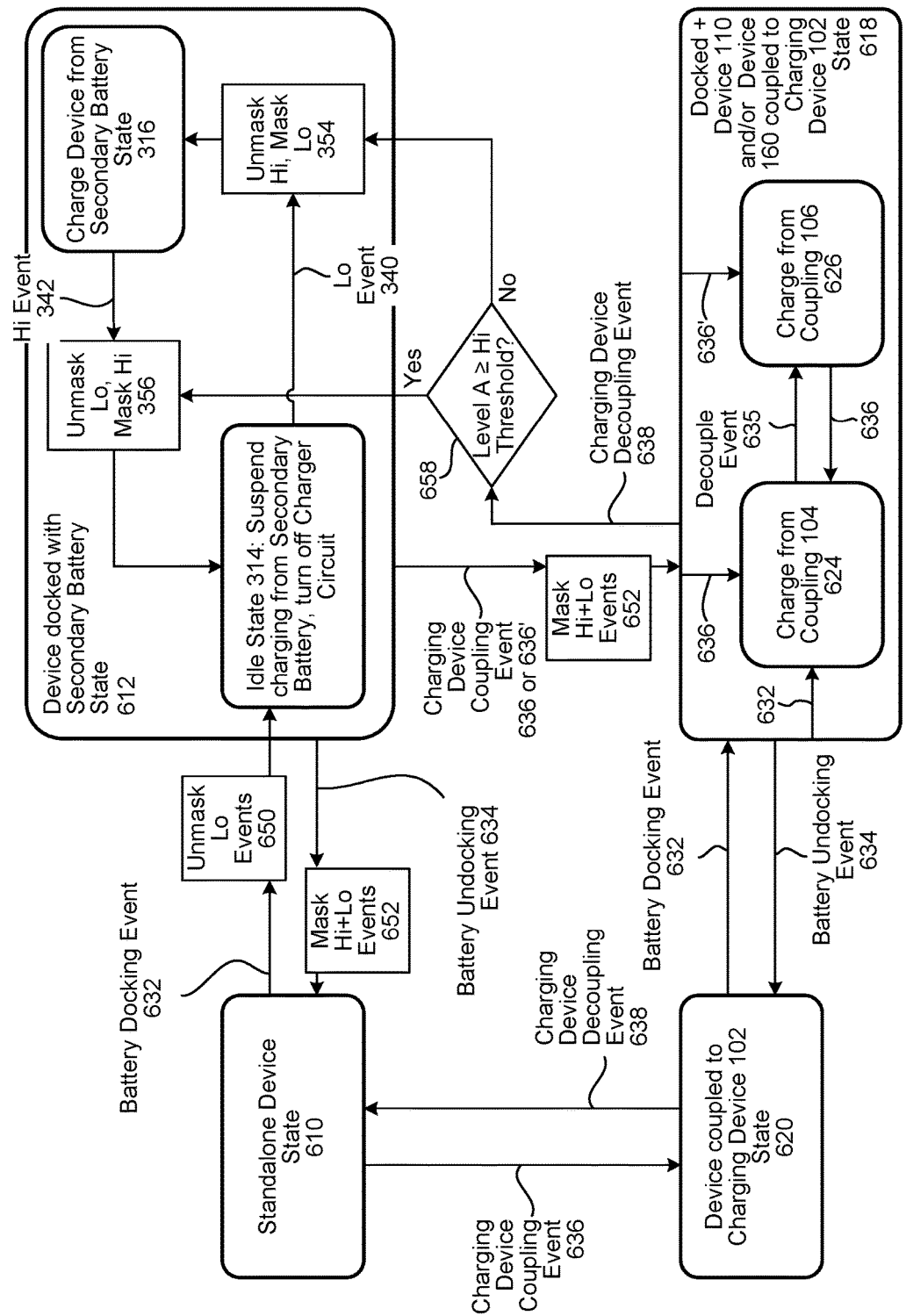

DYNAMIC POWER OPTIMIZATION WHEN TRANSFERRING POWER BETWEEN BATTERIES

BACKGROUND

Electronic devices, such as e-book readers, smartphones, tablet computers, and zero-emission electric vehicles, receive power from their batteries, which require recharge after some period of usage. One way to increase the capacity of these batteries and to extend battery life is to increase the mass of the battery, which in many circumstances is undesirable.

To recharge the device's battery without connecting to the power grid, solutions exist where the device is connected to an external secondary battery. For example, the device may be connected to an external battery pack, such as a battery pack that connects to the device via a proprietary interface (such as device "case" that includes a secondary battery). Provided herein are technical solutions to, among other things, problems related to battery-powered devices.

BRIEF DESCRIPTION OF DRAWINGS

For a more complete understanding of the present disclosure, reference is now made to the following description taken in conjunction with the accompanying drawings.

FIG. 4A is an example of charging and discharging cycles of the device as the device's battery is charged using electrical energy from the secondary battery based on states in FIG. 3.

FIG. 6 is a state diagram that includes system charging states in addition to those in FIG. 3.

DETAILED DESCRIPTION

Figure 1:
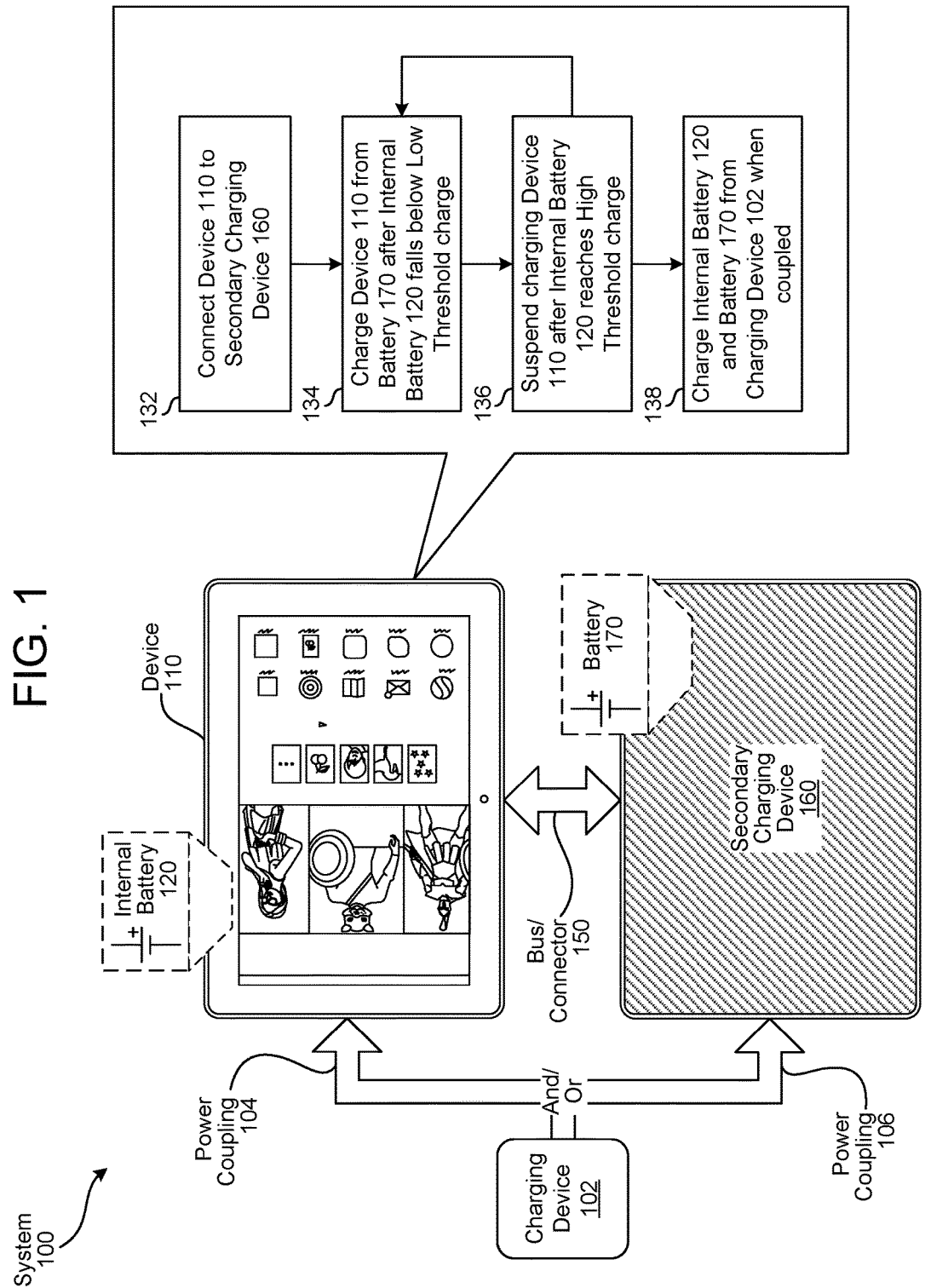
FIG. 1 illustrates a modular charging system for a device that includes a secondary battery in addition to the battery within the device.

FIG. 1 illustrates a modular charging system 100 for a device 110 that charges the internal battery 120 of the device 110 using energy from a battery 170 in a secondary charging device 160. The battery 170 within the secondary charging device 160 may be, for example, a larger battery that is capable of holding a larger charge than the battery 120 within the device 110. The device 110 electrically connects (132) to the secondary charging device 160 via a bus and/or connector 150. The secondary charging device 160 may take a number of different forms. For example, the secondary charging device 160 may be included in a case/cover for device 110, thus allowing the secondary charging device 160 and secondary battery 170 to be removable from the device 110 (i.e., not included within a housing of 110 but rather connected to the device 110 through an external connector), and be hot-pluggable so that it is able to be easily connected and disconnected from the device 110 during normal use, without requiring the device 110 to be powered down before the secondary charging device 160 is connected or removed.

As referred to herein, when the device 110 is electrically connected to the device 160 via the bus/connector 150, the devices 110 and 160 are "docked" with each other. When the devices 110 and 160 are not electrically connected to each other, they are "undocked." Although there may be a mechanical connection between devices 110 and 160 when they are electrically connected, "docking" only denotes the electrical connection, such that the devices 110 and 160 may or may not be in physical contact with each other when "docked."

To preserve the lifetime of the battery 170 of the secondary charging device 160 and improve overall operational efficiency, the device 110 charges from the secondary battery 170 when the charge level of the battery 120 falls (134) below a first threshold level ("Lo"). The device 110 may continue charging from the secondary battery 170 until (136) the charge level of the internal battery 120 reaches or exceeds a second threshold level ("Hi"). The second threshold "Hi" level is greater than the first threshold "Lo" level, but is less than the fully-charged level of the internal battery 120. For example, the first threshold level "Lo" may be 80% of the full charge of the first battery 120, and the second threshold level "Hi" may be 95% of the full charge of the first battery 120.

As other examples, the "Lo" threshold may be 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 81%, 82%, 83%, 84%, 85%, 86%, 87%, 88%, 89%, or 90%. The "Hi" threshold is greater than the "Lo" threshold, but less than 100% (i.e., fully charged). Examples of the "Hi" threshold include 85%, 86%, 87%, 88%, 89%, 90%, 91%, 92%, 93%, 94%, 95%, 96%, or 97%.

This charging cycle continues until the battery 170 is drained and can no longer charge the internal battery 120, the secondary charging device 160 is undocked (i.e., disconnected) from the device 110, the device 110 is coupled via power coupling 104 to a charging device 102, and/or the secondary charging device is coupled via power coupling 106 to a charging device 102. The charging device 102 may be, for example, a Universal Serial Bus (USB) wall adapter to convert a wall plug voltage (e.g., 110 VAC to 240 VAC) into+5 VDC, may be an inductive charging station, etc. Power couplings 104 and 106 may be wired connections (e.g., USB) or wireless (e.g., inductive charging). After the charging device 102 is coupled to the device 110 and/or secondary charging device 160, electrical energy from the charging device 102 may be used to charge (138) both the internal battery 120 and the battery 170 (via the bus/connector 150).

Figure 2:
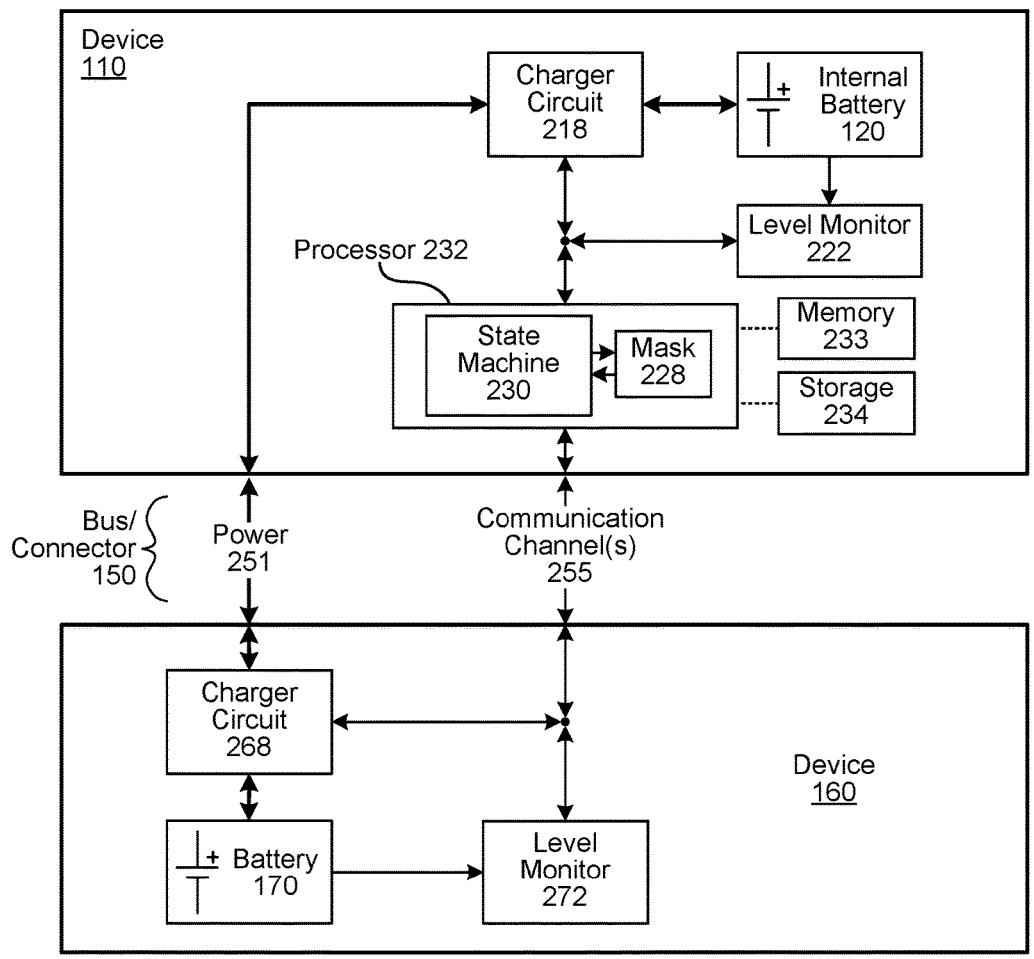
FIG. 2 is a block diagram conceptually illustrating example components of the modular system.

FIG. 2 is a block diagram conceptually illustrating example components of the modular system. The device 110 and the device 160 include several components that may be conventional features of device charging systems. For example, a component that may be conventional is the charger circuit 218 and the level monitor 222, which may be included in a same power management integrated circuit (PMIC). The charger 218 charges the internal battery 120 using electrical energy received at its input. The level monitor 222 determines a charge level of the internal battery 120 (i.e., the "State of Charge" or SOC), and is sometimes referred to as a "fuel gauge." SOC may be represented, among other ways, as a percentage, where zero percent corresponds to a fully-drained battery and one hundred percent corresponds to a fully-charged battery. The level monitor 222 may provide the charger circuit 218 with an indication of the internal battery's charge level (SOC), which the charger circuit 218 may use to control the rate at which electrical energy is applied to the internal battery 120. As known in the art, the level monitor 222 may use any suitable SOC measurement/estimation technique or combination of techniques, such as voltage-based estimation, current-based estimation (e.g., Coulomb counting), impedance measurement, etc. The level monitor 222 provides software-programmable threshold level detection, which may be output (among other ways) as hardware interrupt signals to the device's processor 232. Such interrupts are conventionally used to support device services such as low battery warnings.

When docked, the device 110 and the secondary charging device 160 may exchange data via communication channel(s) 255 of the bus/connector 150, and electrical energy via a power connection 251 of the bus/connector 150. The processor 232 of the device 110 can acquire status information from the secondary charging device's charger circuit 268 and/or the charge level of the secondary battery 170 (i.e., the "State of Charge" or SOC) from a level monitor 272 via the communication channel(s) 255. The charger circuit 268 and the level monitor 272 may be separate components, or part of an integrated PMIC. As discussed above in connection with level monitor 222, the level monitor 272 may use any suitable SOC measurement/ estimation technique or combination of techniques.

Operations of the system 100 are orchestrated by a state machine 230 of the processor 232. In accordance with states of the state machine 230, and events triggering transitions between states, the processor 232 controls components of the device 110, and thereby also controls operation of the device 160 when it is docked with the device 110. Based on event transitions between states, the processor 232 also masks and unmasks threshold event interrupt signals (e.g., "Lo" event, "Hi" event) by setting bits of a bit mask in an interrupt mask register (IMR) 228 of the processor 232.

The selective masking of interrupt enables low power operations, allowing the state machine 230 and processor 232 to enter a sleep or low-power state for extended periods of time without unnecessary and inefficient wakeups unless the event will result in the state machine 230 changing a state of operation. For example, the level monitor 222 may periodically or intermittently compare the charge level of the battery 120 to the thresholds (e.g., "Lo" and "Hi") to determine whether to issue a threshold event interrupt. As a consequence of these periodic/intermittent checks, the level monitor 222 may issue more than one interrupt for a same event in succession, such as repeated "Hi" event interrupts or repeated "Lo" event interrupts. Such superfluous interrupts may reduce the device's energy efficiency by repeatedly waking the processor 232, even though the indicated events will not alter the state of the state machine 230.

The state machine 230 may be a software or firmware program stored in nonvolatile storage 234, to be executed by the processor 232 as a program using memory 233 for runtime operations. That state machine 230 may also be fixed or programmed logic circuits included in or connected to the processor 232.

The exact combination of Lo and Hi thresholds may be optimized experimentally/empirically or based on modelling so as to maximize operational efficiency while preserving the lifetimes of both batteries. The 80% Lo/95% Hi example, for instance, is contemplated for use with lithium-ion cells coupled to conventional PMICs. When not charging, the state machine 230 may turn off the charger circuit 218, reducing power consumption within the device 110 and improving overall efficiency. Likewise, when not charging the device 110, the charger circuit 268 can be configured to enter a low-power state, isolating battery 170 so as to preserve charge. Also, as the internal battery 120 approaches full charge (100% of SOC), charging efficiency may decline (e.g., as cell heating increases). By suspending charging at the Hi threshold, instead of 100% of SOC, the overall efficiency of the system 100 can be improved.

Figure 3:
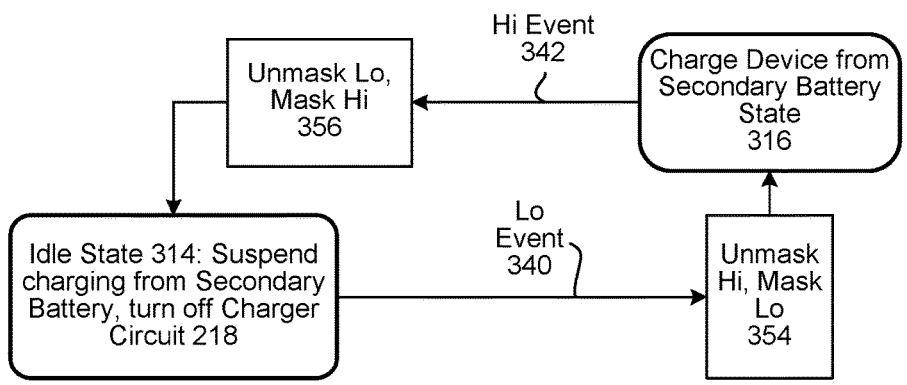
FIG. 3 is a state diagram illustrating charging states of the modular system for charging the battery within the device from the secondary battery.

FIG. 3 is a state diagram illustrating transitions of the state machine 230 between charging and not charging the battery 120 from battery 170, while the device 110 and the device 160 are docked via the bus/connector 150. While docked with the secondary charging device 160 without other external power (i.e., without electrical energy provided by charging device 102), the state machine 230 initially alternates between states 314 and 316 based on the charge level of the battery 120.

In an idle state 314, charging from the battery 170 is suspended, and the processor 232 may turn off charger circuit 218 to conserve power. In the charge/boost state 316, the processor 232 turns on the charger circuit 218 and charges the internal battery 120 using electrical energy from the battery 170. Transitions between these states are caused by threshold events. In the idle state 314, the "Lo" threshold level event interrupt 340 is unmasked (i.e., subscribed to), whereas the "Hi" threshold level event interrupt 342 is masked (i.e., unsubscribed, so as to be ignored). In the charge/boost state 316, the "Hi" threshold level event interrupt 342 is unmasked (i.e., subscribed to), whereas the "Lo" threshold level event interrupt 340 is masked (i.e., unsubscribed, so as to be ignored).

When a "Lo" threshold event 340 occurs in the idle state 314, the processor 232 unmasks (354) the "Hi" threshold level event interrupt (i.e., subscribes), and masks the "Lo" threshold level event interrupt (i.e., unsubscribes, so as to be ignored), as the state machine 230 transitions to state 316, causing charger circuit 218 to boost/charge the internal battery 120 using energy from the secondary battery 170.

When a "Hi" threshold level event 342 occurs in the charge/boost state 316, the processor 232 unmasks (356) the "Lo" threshold level event interrupt (i.e., subscribes), and masks the "Hi" threshold level event interrupt (i.e., unsubscribes, so as to be ignored), as the state machine 230 transitions to idle state 314, allowing the charger circuit 218 to be turned off or placed in a reduced-power or standby state. In the idle state 314, the device 160 may also place the charger circuit 268 into a reduced power or standby state.

FIG. 4A is an example of boosting/charging and discharging cycles of the device 110 as the device's internal battery 120 is periodically charged using electrical energy from the battery 170. The internal battery charge level 424 corresponds to the internal battery's State of Charge (SOC). As illustrated, the amounts of time between the internal battery Charge Level 424 rising to the "Hi" threshold level (causing Hi threshold event interrupt 342) and falling to the "Lo" threshold level (causing Lo threshold interrupt 340) are periodic. Such periodicity might occur if, for example, the device 110 is not being used and the time scale is large (e.g., days, weeks, etc.). However, under normal device use conditions, the durations between threshold level events 340 and 342 may be aperiodic and non-linear.

Figure 4B:
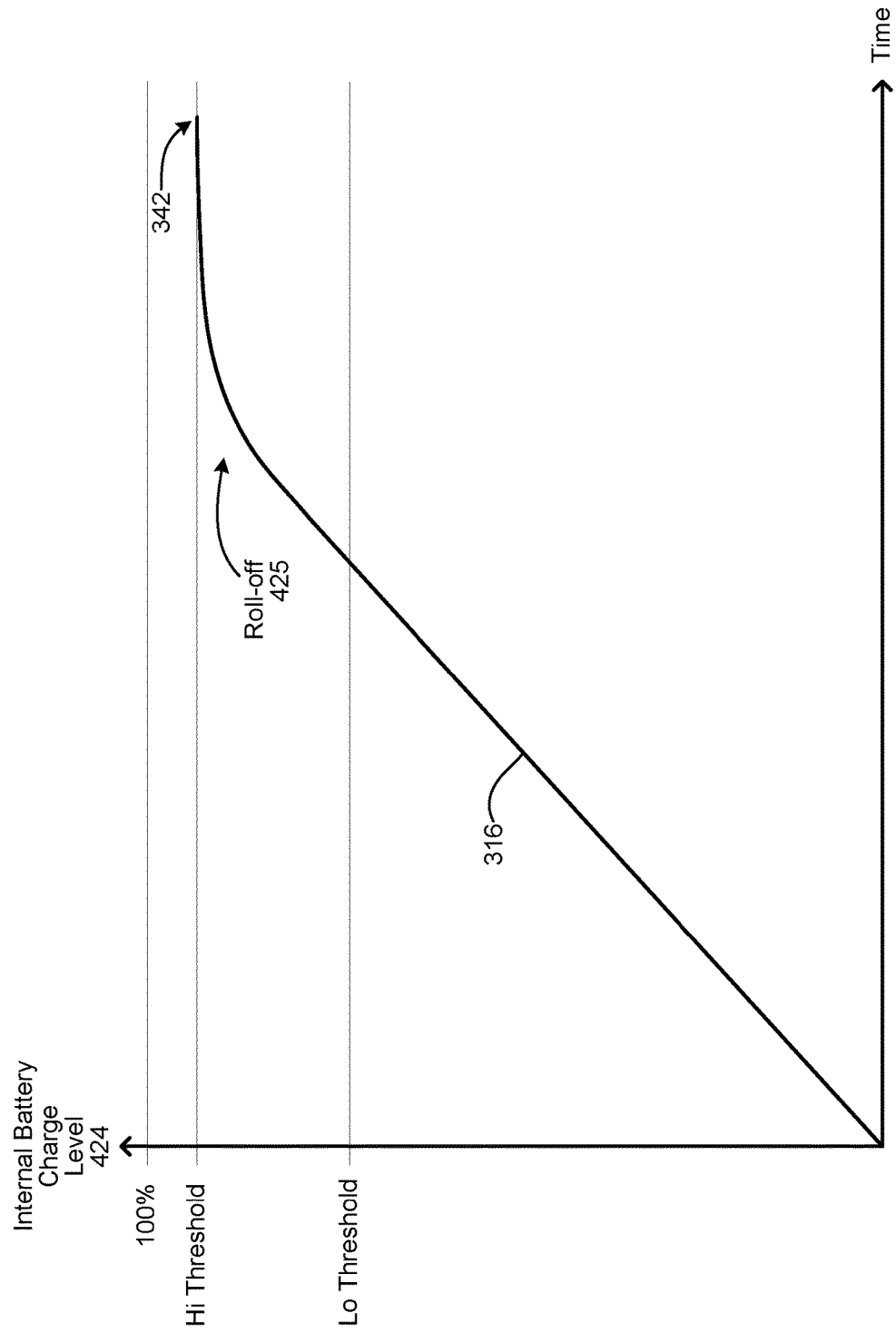
FIG. 4B is an example of a taper in the top-off region during a charging cycle.

Also, while FIG. 4A illustrates a slight taper to the boosting/charging curves, the charging and discharging curves may not be as linear as illustrated. For example, the charging curve may taper/roll-off to top-off the battery 120 in a non-linear manner, as illustrated in FIG. 4B. In terms of time, the discharge curves will ordinarily be much slower (i.e., take a longer time to transition between the "Hi" threshold and the "Lo" threshold) than the charging curves. The non-linear roll-off 425 of such boosting/charging curves may be dependent upon the technique used by the charger circuit 218 to charge the battery (i.e., 120), and commonly occurs when using a rapid charging technique that reduces battery heating and wear. However, these charging curves are merely an example of what a charging cycle might look like, and the actual curvatures may vary. The charging/boosting and discharging process illustrated in FIG. 4A will continue indefinitely, until the battery 170 no longer has sufficient charge to boost the internal battery 120, or the state machine 230 exits both states 314 and 316, as will be discussed further below.

Figure 5A:
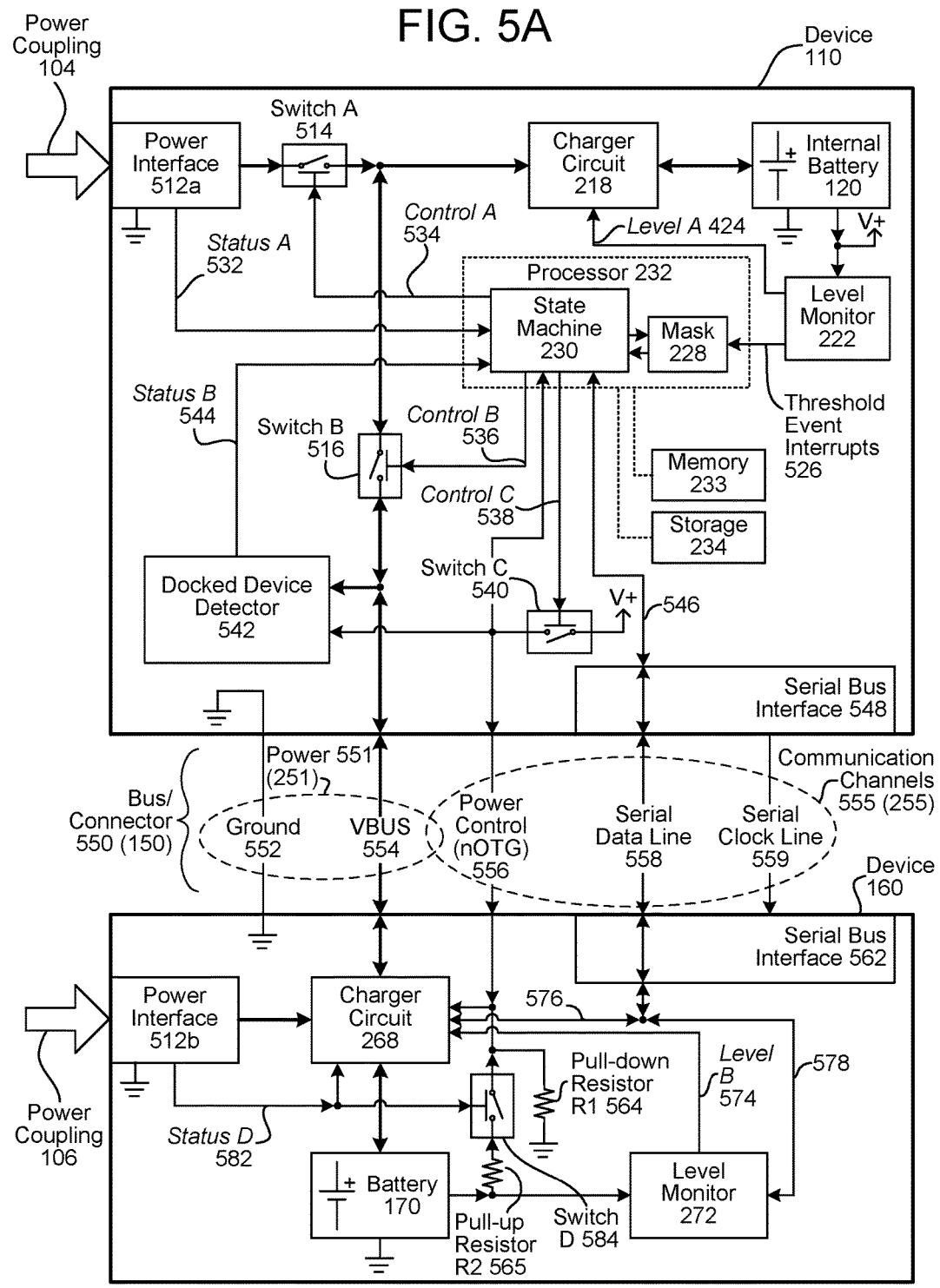
FIGS. 5A and 5B are block diagrams conceptually illustrating additional components as further examples of the modular system.
Figure 5B:
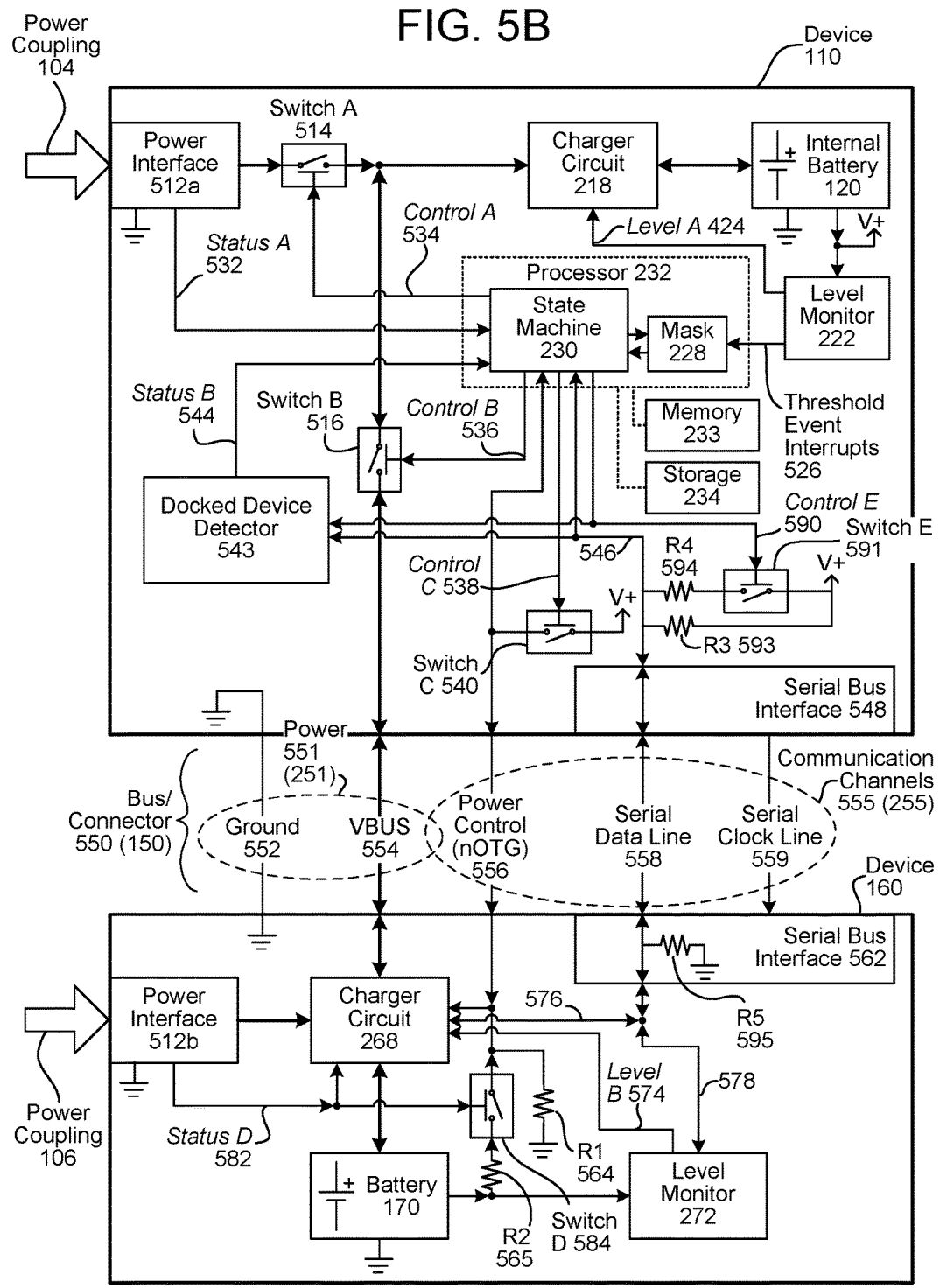

FIGS. 5A and 5B are block diagrams conceptually illustrating examples of additional components that may be included in the modular system 100. The device 110 and the secondary charging device 160 may each include a power interface 512a and 512b. The power interfaces 512a and 512b may be of any wired (e.g., USB) or wireless (e.g., inductive) design. In the device 110, the power interface 512a transfers electrical energy received via the power coupling 104 into the device 110. The power interface 512a may include a logic-level output (Status A 532) that indicates whether the device 110 is or is not coupled to the charging device 102. Similarly, in the device 160, the power interface 512b transfers electrical energy received via the power coupling 106 into the device 160. The power interface 512b may include a logic-level output (Status D 582) that indicates whether the device 160 is or is not coupled to the charging device 102.

As illustrated in FIGS. 5A and 5B, the level monitor 222 may provide the charger circuit 218 with an indication of the internal battery's charge level (Level A 424), which the charger circuit 218 may use to control the rate at which electrical energy is applied to the internal battery 120. The level monitor 222 may provide software-programmable threshold level detection, which may be output (among other ways) as hardware interrupt signals 526 to the device's processor 232. As noted in the discussion of FIG. 2, such interrupts may conventionally be used to support device services such as low battery warnings.

In the examples in FIGS. 5A and 5B, communication between the device 110 and the device 160 are via communication channels 555, which are an example of communication channel(s) 255 in FIG. 2. The communication channels 255 include a power control (nOTG) line 556 and an I²C bus comprising a serial data line 558 and a serial clock line 559. Signaling on the power control line 556 may be based on power control signaling in accordance with the USB On-The-Go (OTG) specification, or based on an OTG-independent signaling scheme. The power connection 551 is an example of the power connection 251 in FIG. 2, and comprises a ground connection 552 and a power transfer line (VBUS) 554.

The device 110 and the device 160 may exchange data via the serial bus interfaces 548 and 562 which support the I²C bus, although other serial communication protocols may be used, with I²C being an example. Among other things, via the serial interfaces 548 and 562, the processor 232 of the device 110 can acquire status information from the charger circuit 268 (via connection 576) and/or the charge level of the battery 170 from the level monitor 272 (via connection 578). Among other things, the processor 232 may determine the charge level (Level B 574) of the battery 170 via connection 578. The level monitor 272 also provides the charge level (Level B 574) to the charger circuit 268, which the charger circuit 268 may use to regulate the charging of the battery 170. The processor 232 may also perform other operations, such as setting threshold levels for charge level signaling (e.g., interrupts 526) and receiving the charge level signaling (via connections 546, 576, and 578) from the device 160. The charger circuit 268 and the level monitor 272 may be separate components, or part of an integrated PMIC.

Operations of the system 100 are orchestrated by the state machine 230 of the processor 232. In accordance with states of the state machine 230, and events triggering transitions between states, the processor 232 controls components of the device 110, and thereby may also control operation of the device 160 when it is docked with the device 110. Based on event transitions between states, the processor 232 also masks and unmasks threshold event interrupt signals 526 (e.g., "Lo" event, "Hi" event) by setting bits of a bit mask in an interrupt mask register (IMR) 228 of the processor 232.

The selective masking of interrupt enables low power operations, allowing the processor 232 to enter a sleep or low-power state for extended periods of time without unnecessary and inefficient wakeups unless the event will result in the state machine 230 changing a state of operation. For example, the level monitor 222 may periodically or intermittently compare the charge level (Level A 424) to the thresholds (e.g., "Lo" and "Hi") to determine whether to issue a threshold event interrupt 526. As a consequence of these periodic/intermittent checks, the level monitor 222 may issue more than one interrupt for a same event in succession, such as repeated "Hi" event interrupts or repeated "Lo" event interrupts. Such superfluous interrupts may reduce the device's energy efficiency by repeatedly waking the processor 232, even though the indicated events will not alter the state of the state machine 230.

The state machine 230 may be a software or firmware program stored in nonvolatile storage 234, to be executed by the processor 232 as a program using memory 233 for runtime operations. That state machine 230 may also comprise fixed or programmed logic circuits included in or connected to the processor 232.

FIG. 6 is a state diagram illustrating transitions between charging states of the state machine 230 in addition to those in FIG. 3, along with associated operations of the processor 232. As illustrated in FIG. 6, the states 314 and 316 from FIG. 3 are included within state 612 in FIG. 6, corresponding to the state in which the device 110 and the device 160 are docked, but neither is coupled to the external power charging device 102.

As illustrated in FIGS. 5A and 5B, the processor 232 receives the Status A signal 532 from the power interface 512a indicating whether the device 110 is or is not coupled to the external charging device 102. Referring to FIG. 6, the changing of the Status A signal 532 to indicate that an external charging device 102 has been coupled causes a charging device coupling event 636, producing a change of state. If the charging device coupling event 636 occurs when the state machine 230 is in a standalone device state 610, the state machine 230 transitions to a state 620 corresponding to the device 110 being coupled to the charging device 102 while undocked from the device 160.

If the charging device coupling event 636 occurs when the state machine 230 is in a state 612 corresponding to the device 110 being docked with the secondary battery 160 but not the external charging device 102, the state machine 230 transitions to a state 618 corresponding to the device 110 being docked with the secondary charging device 160, and the device 110 and/or 160 being coupled to the external charging device 102. Within the state 618, the state machine enters state 624, corresponding to the device 110 charging the battery 120 using electrical energy received via the power coupling 104.

The device 160 may also signal the processor 232 (e.g., via the power control line 556 or the I²C interface) that the device 160 is coupled to the charging device 102 via the power coupling 106, causing a charging device coupling event 636'. If the state machine 230 is in the state 612, this causes the state machine to enter the charging state 626 within state 618. If the device 110 is in the charging state 624, charging the battery 120 from power coupling 104, and the power coupling 104 is decoupled (changing Status A 532), but the device 160 indicates that it is coupled to the charging device 102 via power coupling 106, the result is a decoupling event 635 that causes the state machine to switch from state 624 to state 626, continuing to charge the battery 120, but from electrical energy received at coupling 106 instead of power coupling 104.

When the external charging device 102 is decoupled from the system 100, corresponding to the Status A signal 532 changing to indicate that the external charging device 102 has been decoupled from the device 110, and/or the Status D signal 532 changing to indicate that the external charging device 102 has been decoupled from the device 160, the decoupling of charging device 102 causes a charging device decoupling event 638 in the state diagram in FIG. 6. If the state machine 230 is in the state 620 corresponding to the device 110 being coupled to the external charging device 102 but not docked with device 160, event 638 cause the state machine 230 to transition to the standalone device state 610. If the state machine 230 is in the state 618 corresponding to the device 110 and/or device 160 being coupled to the charging device 102 and the devices 110 and 160 docked with each other, the event 338 cause the state machine 230 to transition to the state 612.

When making the transition from state 618 to state 612, the processor 232 determines (658) whether the charge level (Level A 424) of the battery 120 is greater than or equal to the "Hi" threshold. If the Level A 424 is greater than or equal to the "Hi" threshold (658 "Yes"), the processor unmasks (356) the "Lo" interrupt and masks the "Hi" interrupt, with the state machine 230 entering idle state 314. In the alternative, if the Level A 424 is not greater than or equal to the "Hi" threshold (658 "No"), the processor unmasks (354) the "Hi" interrupt and masks the "Lo" interrupt, with the state machine 230 entering the battery charge/boost state 316.

Referring back to FIGS. 5A and 5B, the processor 232 also receives a Status B signal 544 from a docked device detector 542 in FIG. 5A, and from a docked device detector 543 in FIG. 5B. The status B signal 544 indicates whether the device 110 and the device 160 are or are not docked (i.e., electrically connected via bus/connector 150/550). Operation of the docked device detectors 542 and 543 will be discussed further below. The Status B signal 544 transitioning from an indication that the device 160 is undocked to being docked causes the battery docking events 632 in FIG. 6. If the state machine 230 is in the standalone state 610 when the event 632 occurs, the state machine 230 transitions to the state 612. If the state machine 230 is in the state 620 when the event 632 occurs, the state machine transitions to the state 618. The Status B signal 544 transitioning from an indication that the device 160 is docked to being undocked causes the battery undocking events 634 in FIG. 6. If the state machine 230 is in the state 612 when the event 634 occurs, the state machine 230 transitions to the state 610. If the state machine 230 is in the state 618 when the event 634 occurs, the state machine transitions to the state 620.

Table 1 is an example of states as they relate to status signals (Status A 532 and Status B 544) received by the processor 232 as input, and control signals associated with the states that are output by the processor 232 (Control Signal A 234, Control Signal B 236, Control Signal C 238). As will be described further below, the power control line 556 may be used for bidirectional signaling if the device 160 uses the power control line 556 to indicate when it is directly coupled to the charging device 102 via the power coupling 106 (instead of using the I²C interface to signal that electrical energy is being received via power coupling 106). In Table 1, if the state of control line 556 is not used to determine the state of the state machine 230, the table entry is denoted as an "X". However, example the states of the power control line 556 that may occur even when the power control line 556 does not affect the state are denoted in parenthesis. "High" and "Low" correspond to voltage levels commonly associated with binary logic. "Hi-Z" corresponds to a high impedance state as may occur due to an open circuit.

TABLE 1

| STATE MACHINE 230 | STATUS A 532 | STATUS B 544 | CTRL A 534 | CTRL B 536 | CTRL C 538 | CTRL LINE (nOTG) 556 |
|---|---|---|---|---|---|---|
| Standalone 610 | Uncoupled | Undocked | Open | Open | Open | X (Hi-Z) |
| Idle 612/314 | Uncoupled | Docked | Open | Open | Open | X (Low) |
| Charge/Boost 612/316 | Uncoupled | Docked | Open | Close | Close | X (High) |
| Charge from 104 618/624 | Coupled | Docked | Close | Close | Open | X (Low or High) |
| Charge from 106 618/626 | Uncoupled | Docked | Open | Close | Open | High |
| Charge Primary 620 | Coupled | Undocked | Close | Open | Open | X (Hi-Z) |

The examples of the device 110 in FIGS. 5A and 5B include several solid-state switches, such as Switch A 514, Switch B 516, and Switch C 540, as well as Switch E 590 (FIG. 5B only). The Control A signal 534 controls a state of a Switch A 514, which connects and disconnects the power output of the power interface 512a to-and-from a power input of the charger circuit 218. When the state machine 230 is in state 610 or state 612 (including 314 and 316), the processor 232 sets the Control A signal 534 to open the Switch A 214, such that the output of the power interface 512a is not electrically connected to the input of the charger circuit 218. When the state machine 230 is in state 618 or state 620, the processor 232 sets the Control A signal 534 to close the Switch A 514, electrically connecting the power output of the power interface 512a to the input of the charger circuit 218.

The Control B signal 536 controls a state of a Switch B 516, which connects and disconnects a VBUS line 554 of the bus/connector 550 (150) to-and-from the power input of the charger circuit 218. When the state machine 230 is in state 610, state 314 with 612, or state 620, the processor 232 sets the Control B signal 536 to open the Switch B 516, such that the VBUS line 554 is not electrically connected to the input of the charger circuit 218. When the state machine 230 is in state 316 within state 612 or state 618, the processor 232 sets the Control B signal 536 to close the Switch B 516, electrically connecting the VBUS line 554 to the input of the charger circuit 218.

The Control C signal 538 controls a state of a Switch C 540, which connects and disconnects the Power Control line 556 of the bus/connector 550 to-and-from a positive voltage such as that of the V+ voltage terminal of the internal battery 120. As an alternative to a solid-state switch, Switch C 540 may instead be a tri-state buffer.

When the state machine 230 is in state 610, state 314 within state 612, state 618, or state 620, the processor 232 sets the Control C signal 538 to open the Switch C 540, such that the Power Control line 556 is not electrically connected to the positive voltage (e.g., the V+ voltage terminal of battery 120). If Switch C 540 is open and the device 110 is docked with the device 160, a pull-down resistor R1 564 within the device 160 that is connected between the Power Control line 556 and the Ground line 552 of the bus connector 550 will pull the voltage level of the Power Control line 556 to a "low" level voltage state, such as a voltage state approximately equal to ground. If Switch C 540 is open and the device 110 is not docked with the device 160, the Power Control line 556 may go to a high-impedance state, or go to a level other than V+ or ground. When the state machine 230 is in state 618, the processor 232 sets the Control C signal 538 to close the Switch C 540, such that the Power Control line 556 is electrically connected to the positive voltage (e.g., the V+ voltage terminal of battery 120). This pulls-up the voltage on the Power Control line 556 to approximately the positive voltage, producing a "high" logic-level voltage state.

An example of operational states of the Charger Circuit 268 of the device 160 are described in Table 2:

TABLE 2

| VBUS 554 | POWER CONTROL (nOTG) 556 | STATUS D 582/ SWITCH D 584 | BATTERY CHARGER CIRCUIT 268 |
|---|---|---|---|
| Power Detected | Low (Pull-down) | Decoupled/Open | Charge Battery 170 from Power Coupling 104 |
| X | High | Decoupled/Open | Output Battery Voltage to VBUS 554 |
| No Power Detected | Low (Pull-down) | Decoupled/Open | Low Power/ Standby |
| X | High | Coupled/Close | Charge Battery 170 from Power Coupling 106 |

When the Charger Circuit 268 detects a "low" logic-level voltage state on the Power Control line 556 and detects electrical energy on the VBUS line 554, the Charger Circuit 268 configures itself to charge the Battery 170 using the electrical energy received on the VBUS line 554. When the Charger Circuit 268 detects a "high" level voltage on the Power Control line 556, irrespective of the state of the VBUS line 554 (as indicated by the "X" in Table 2), the Charger Circuit 268 configures itself to connect the Battery 170 to the Device 110 via the VBUS line 254 to charge ("boost") the charge on the Battery 120. When the Charger Circuit 268 detects a "low" logic-level voltage state on the Power Control line 556 and does not detect electrical energy on the VBUS line 554, the Charger Circuit 268 disconnects the battery 170 from the VBUS line 554 and may also enter a low-power "standby" state. The Charger Circuit 268 may enter this same standby state when undocked from the device 110, as the levels/states of the VBUS line 554 and the Power Control line 556 will be the substantially the same as when the secondary charging device 160 enters the standby state while docked with the device 110.

If a Status D signal 582 output by the Power Interface 512b indicates that the device 160 is coupled to the power charging device 102 via power coupling 106, Switch D 584 closes, pulling up the voltage on the Power Control line 556 to a logic "high" voltage (e.g., connecting the Power Control line 556 to the positive voltage output by battery 170 via a pull-up resistor R2 565). If the Status D signal 582 indicates that the device 160 is not coupled to the power charging device 102, Switch D 584 opens. This pulling up of the Power Control line 556 provides bidirectional signaling to the state machine 320. In particular, the processor 232 pulls the power control line 556 up by closing Switch C 540 when the device 110 is coupled to the external charging device 102. If the device 110 is decoupled from the charging device 102, causing Switch C 540 to open, but the voltage level on the Power Control line 556 is high, then the state machine 230 determines that the Device 160 is coupled to the external charging device 102 via the power coupling 106.

In FIG. 6, there are several event masking operations (650, 652, 354, 356) that occur during the transitions between states. These operations subscribe and unsubscribe the processor 232 from and to the threshold event interrupt signals 526 (e.g., "Lo" event, "Hi" event) by setting bits of a bit mask in an interrupt mask register (IMR) 228 of the processor 232. As noted above, each event based on the charge level of the internal battery 120 (Level A 424) may result in countless duplicate event signals in series. If received, each of these event signals would "wake" the processor 232, decreasing power efficiency. Through use of the state machine 230 and by selectively ignoring events (i.e., unsubscribed events), the processor 232 may enter a low power mode after it enters a state (e.g., 610, 314, 316, 620, 624, and 626), and remain in that low power state until an event occurs that will result in a change to another state. Although not illustrated in FIG. 6, the processor 232 may also mask (652) both "Lo" and "Hi" events when entering and exiting state 620.

An example of how battery charge threshold events/interrupts may be masked (unsubscribed/ignored) and unmasked (subscribed) by the processor 232 as the state machine 230 transitions into each state is described in Table 3:

TABLE 3

| STATE MACHINE 230 | Lo Event 340 | Hi Event 342 |
|---|---|---|
| Standalone 610 | Unsubscribe | Unsubscribe |
| Idle State 314 | Subscribe | Unsubscribe |
| Charge/Boost 316 | Unsubscribe | Subscribe |

TABLE 3-continued

| STATE MACHINE 230 | Lo Event 340 | Hi Event 342 |
|---|---|---|
| Charge Primary and Secondary 618 (624/626) | Unsubscribe | Unsubscribe |
| Charge Primary 620 | Unsubscribe | Unsubscribe |

For example, when a battery docking event 632 causes the state machine to transition from state 610 to state 314 within state 612, the processor 232 unmasks 650 (i.e., subscribes to) the "Lo" threshold level event interrupt. Likewise, when a charging device decoupling event 638 causes the state machine 230 to transition from state 618 to state 612 and Level A 424 is greater than or equal to the "Hi" threshold, the processor 232 unmasks 356 (i.e., subscribes to) the "Lo" threshold event interrupt and masks the "Hi" threshold event interrupt. When the charging device decoupling event 638 causes the state machine 230 to transition from state 618 to state 612 and Level A 424 is not greater than or equal to the "Hi" threshold, the processor 232 unmasks 354 the "Hi" threshold event interrupt and masks the "Lo" threshold event interrupt.

When entering the state 612, the processor 232 may also signal the level monitor 222 to determine the charge Level A 424 of the internal battery 120, so as refresh the threshold level event interrupts. In the alternative, the processor 232 may wait for the level monitor 222 to refresh in due course before determining (658) which interrupts to mask and which interrupts to unmask. Outside of the state 612, the other events between states result in the processor 232 unsubscribing from both the "Lo" and "Hi" threshold level event interrupts, such that the threshold level event interrupts will be ignored by the processor 232.

While in state 612, whether in sub-state 314 or sub-state 316, if a battery undocking event 634 occurs, the state machine 230 transitions to the state 610. Likewise, while in state 612, whether in sub-state 314 or sub-state 316, if a charging device coupling event 636 occurs, the state machine 230 transitions to the sub-state 624 within state 618.

Figure 7A:
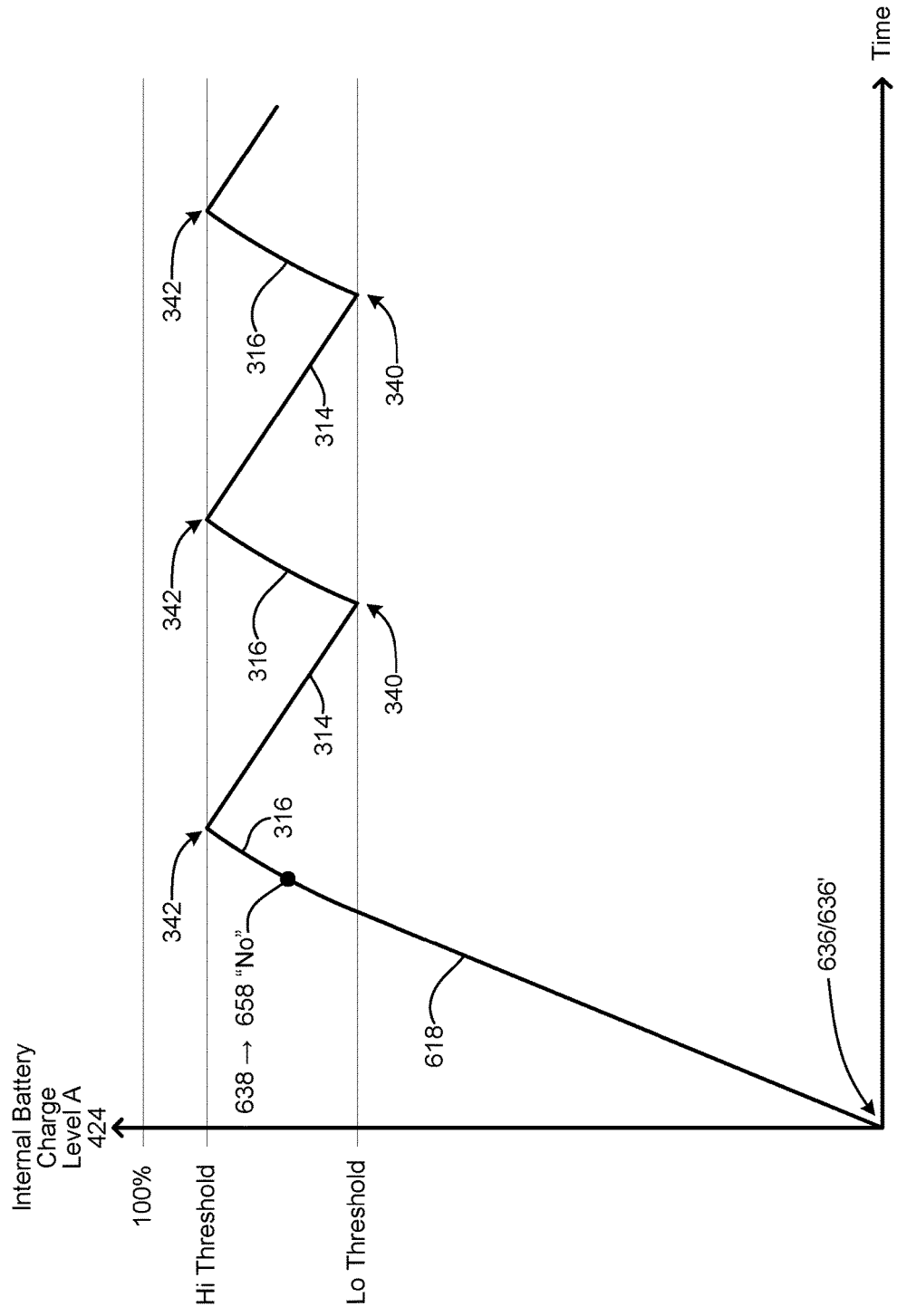
FIGS. 7A and 7B are examples of charging and discharging cycles of the device as the device's battery based on states in FIG. 6.
Figure 7B:
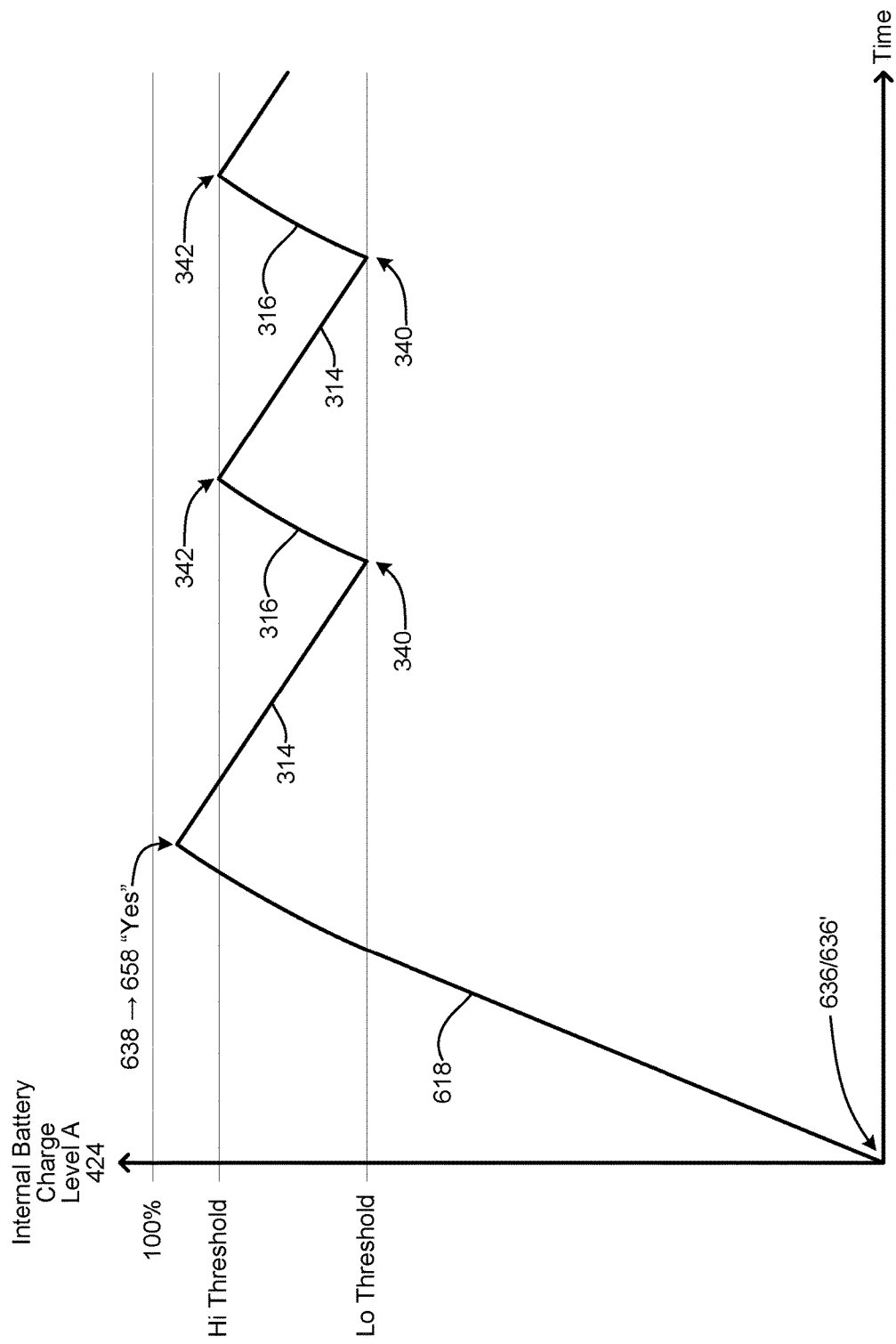

FIGS. 7A and 7B illustrate examples of how the system 100 responds if the charging device 102 is disconnected prior to the internal battery 120 reaching a full charge, in accordance with the state diagram in FIG. 6 with the devices 110 and 160 docked to each other. As illustrated in FIG. 7A, charging device 102 is decoupled from the system 100 prior to the battery level 424 reaching the "Hi" threshold, causing a decoupling event 638. In this case, the state machine 230 transitions to state 316, continuing to charge the internal battery 120 from the battery 170 in the device 160 until the "Hi" threshold is reached. In comparison, as illustrated in FIG. 7B, the charging device 102 is decoupled from the system 100 after the battery level 424 is greater than or equal to the "Hi" threshold. In this case, the state machine 230 transitions to the idle state 314, allowing the battery 120 to begin discharging.

Returning to FIG. 5A, the docked device detector 542 may be electrically connected to the VBUS line 554 and the Power Control line 556 of the bus/connector 550, and determine whether the device 160 is docked based on the states of these lines. An example of the operational states of the docked device detector 542 are described in Table 4:

TABLE 4

| VBUS 554 | POWER CONTROL (nOTG) 556 | STATUS B 544 |
|---|---|---|
| X | High-Z | Undocked |
| High-Z | V+ | Undocked |
| X | Ground | Docked |
| V+ | V+ | Docked |

A simple example of the Docked Device Detector 542 uses comparators and binary logic. If a voltage level of the Power Control line 556 is approximately equal to the voltage level of ground 552, a determination is made that the device 160 is docked (without regard to the state of the VBUS line 554 in Table 4, as indicated by the "X"). If both a voltage level of the VBUS line 554 is approximately equal to V+ and a voltage level of the Power Control line 556 is approximately equal to V+, a determination is made that the device 160 is docked, as indicated on the Status B line 544. Otherwise, the Docked Device Detector 542 indicates on Status B line 544 that the device 160 is undocked.

A more robust example of the Docked Device Detector 542 uses tri-state input detection circuits and/or window comparators to determine whether the VBUS line 554 or the Power Control line 556 are in a high-impedance state ("High-Z"). If the Power Control line 556 is in a "High-Z" state, a determination is made that the device 160 is undocked (without regard to the state of the VBUS line 554 in Table 4, as indicated by the "X"). If both a voltage level of the Power Control line 556 is approximately equal to V+ and the VBUS line 554 is in a High-Z state, a determination is made that the device 160 is undocked.

Other solutions may be used to determine whether the device 160 is docked and provide the Status B signal 544, such as determining whether there is a physical/mechanical connection between the device 110 and the device 160.

Another such device docking detection solution is illustrated in FIG. 5B, in which the Docked Device Detector 543 determines whether the device 160 is docked using the I²C bus. The serial data line (SDA) 558 and/or the serial clock line (SCL) 559 of the I²C interface between the device 110 and the device 160 may be bidirectional 'open-drain' lines 558, 559, meaning that the lines are pulled low, but are not directly driven high. Thus, there can be no bus contention where one device is trying to drive the line high while another tries to pull it low, eliminating the potential for damage to the drivers or excessive power dissipation in the system. The SDA line 558 may include a pull-up resistor (e.g., R3 593) on it to restore the signal to high when no device is asserting it low. Similarly, SCL line 559 may have a pull-up resistor on it to restore the signal to high when no device is asserting it low. The pull-up resistors may be connected to the V+ voltage of the internal battery 120 in the device 110, although a different voltage may be used.

The SDA line 558 may be multiplexed between a data exchange mode for inter-device communications and generating an event interrupt for the processor 232 in response to the device 110 being docked to the device 160. The device 110 may include a pull-up resistor R3 593 that is coupled between the SDA line 558 and a positive voltage, such as V+ from the internal battery 120. The device 110 may also include a resistor R4 594 that is coupled between a Switch E 591 and the SDA line 558. The Switch E 591 connects and disconnects the resistor R4 594 to the positive voltage (e.g., V+) in accordance with a Control E signal 590 output by the processor 232. The resistor R3 593 has a higher resistance than the resistor R4 594. The device 160 may include a resistor R5 595 that couples the SDA line 558 to ground. The resistor R5 595 may have a higher resistance than the resistor R4 594 but lower than the resistor R3 593.

When the device 160 is docked with the device 110, the Status B signal 544 output from the device connection detector 543 indicates that the devices are docked to the processor 232 based on the SDA line 558 being pulled down by the resistor R5 595. In response to the state of transition of the Status B signal 544 to "docked," an interrupt may be generated, causing the processor 232 to toggle operation of the I²C bus from the interrupt mode to a data mode used to transfer data between the device 110 and the device 160. This multiplexing "toggle" may be controlled by the processor 232 using the Control E signal 590 to open and close the Switch E 591. When the Switch E 591 is closed, the resistor R4 594 is connected to the positive voltage to pull up the SDA line 558 from the logic-low voltage, held low by the resistor R5 595, to a logic-high voltage to transition the SDA line 558 to a data operation mode. After the data communication finishes, the processor 232 can open Switch E 591 and put the I²C bus back into the interrupt connection-detection mode.

When the device 160 has been undocked from the device 110, the Docked Device Detector 543 detects that on SDA line 558 has transitioned from logic-low level (held down by the resistor R5 595) to logic-high level due to disconnection of resistor R4 594, changing to state of Status B 544 to generate a processor interrupt. Although the example in FIG. 5B uses a two-wire I²C bus, these operational principles discussed in connection with multiplexing the SDA line 558 may be used with other bus configurations, such as single-wire serial bus.

As another example where the Power Control line 556 is not used to detect the docking of the device 160 and/or to signal when the device 110 and/or 160 is coupled to the charging device 102, the state information conveyed by the Control C signal 538 may instead be sent to the charger circuit 268 via the serial bus interfaces 548/562 (or to an inverter connected to the charger circuit 268) to control an operational state of the charger circuit 268 of the device 160. Likewise, the device 160 may communicate when it is coupled to the charging device 102 across the same interface. If such information is conveyed via the I²C interface and device docking and undocking detection is via the I²C interface, the Power Control line 556 may be omitted.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of mobile computers, battery charge circuitry, and state machines should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

It is contemplated that principles of operation disclosed in connection with the device 110 and the device 160 may apply to a wide variety of device architectures. The device 110 may be, for example, any battery powered device, such as a mobile computing device (e.g., smart phone, tablet computer, notebook computer, electronic reader/book, smart-watch, Bluetooth headset, etc.) or an electric vehicle (e.g., an electric car). The bus/connector 150 may be wired between device 110 and device 160 by cable or a contact-to-contact connection (e.g., as might be used when the device 160 is a protective case for the device 110). The device 160 may be a battery pack, a solar-powered charging station, a wind-powered charging station, or most any battery-powered device capable of charging another device through a bus/connector 150 (e.g., a notebook computer as the device 160 charging a smaller device 110 such as a cell phone or Bluetooth headset). Other components not illustrated in FIGS. 2, 5A, and 5B may be included in the device 110 and the device 160, such as components related to other computing and communication functionality that may be provided by the devices 110/160.

As illustrated in FIGS. 4A, 4B, 7A, and 7B, and discussed above, the internal battery charge level 424 corresponds to the internal battery's State of Charge (SOC), such that the Lo Threshold and the Hi Threshold are expressed in terms of percentages in the range between a lower SOC limit such as zero percent (corresponding to the battery being empty) and an upper SOC limit such as one hundred percent (corresponding to the battery being full/fully charged), as determined by the level monitor 222. The Lo Threshold is greater than empty level, but is less than the Hi Threshold. The Hi Threshold is greater than the Lo Threshold, but less than a full level. In other words, 0%<Lo<Hi<100%. However, other charge-level metrics may be used instead, such as the open-circuit voltage across the internal battery 120 (i.e., the voltage differential between V+ and ground), in which case the Hi Threshold and Lo Threshold correspond to voltage levels, such that 0V<Lo<Hi<V+ at a full charge (as determined by the level monitor 222).

The various switches (e.g., 514, 516, 540, 584, 591) may be solid-state switches and/or electromechanical switches (e.g., microelectromechanical systems (MEMS) relay switches). The terms "open" and "close" are used in relation to the states of the various switches. The origin of these terms in the art is mechanical switches and electro-mechanical relays: a pair of contacts is said to be "closed" when electrical current can flow from one to the other (a closed circuit), and is said to be "open" when the contacts are separated by a physical gap, such that no current can flow between contacts at normal voltages (an open circuit). Conceptually, the in-circuit operation of a solid-state switch is analogous to an electro-mechanical relay, even if the physical principles underlying their operation are entirely different. In the context of solid-state switches, "close" or "closed" refers a low-impedance state between terminals, allowing electrical current to flow, whereas "open" or "opened" refers to a high-impedance state between terminals, restricting the flow of electrical current. As known in the art, solid-state switches may allow negligible amounts of current to "leak" between terminals at normal voltages while in an "open" state, and exhibit an "on-state" resistance while in the a "closed" state. For the purpose of understanding the solid-state switches in the disclosed system, factors such as leakage current and on-state resistance are ignored, such that "open" or "opened" may be understood in the traditional way as corresponding to an open circuit that electrically disconnects the switch's terminals, and "close" or "closed" may be understood as corresponding to a closed circuit that electrically connects the switch's terminals.

Aspects of the disclosed system may be implemented as a computer method or as an article of manufacture such as a memory device or non-transitory computer readable storage medium. The computer readable storage medium may be readable by a computer and may comprise instructions for causing a battery-powered mobile device to perform processes described in the present disclosure. The computer readable storage medium may be implemented by a volatile computer memory, non-volatile computer memory/storage, hard drive, solid-state memory, flash drive, removable disk and/or other media. In addition, components such as the state machine 230 may be implemented as an application specific integrated circuit (ASIC), as a field programmable gate array (FPGA), or some combination thereof. At least the charger circuit 218 and the level monitor 222 may be integrated as a power management integrated circuit (PMIC). Similarly, the charger circuit 268 and the level monitor 272 may be integrated as a PMIC, such as a PMIC compliant with the USB On-The-Go (OTG) specification.

As used in this disclosure, the term "a" or "one" may include one or more items unless specifically stated otherwise. Further, the phrase "based on" is intended to mean "based at least in part on" unless specifically stated otherwise.

What is claimed is:

1. A system, comprising:
a removable battery pack comprising:
   a supplemental battery;
   a connector configured to electrically connect the battery pack to an electronic device, the connector comprising a ground line, a control line, and a power line for transferring electrical energy between the battery pack and the electronic device;
   a first charger circuit coupled to the supplemental battery;
the electronic device comprising:
   a device battery;
   a second charger circuit coupled to the device battery, the second charger circuit configured to charge the device battery using power received at an input of the second charger circuit;
   a detection circuit configured to determine a charge level of the device battery, a range of the charge level being from empty to full;
   a first switch having a first terminal connected to the power line and a second terminal connected to the input of the second charger circuit, wherein the power line and the input of the second charger circuit are electrically connected when the first switch is closed;
   a controller configured to:
      at a first time:
         determine that the charge level is below a first threshold, the first threshold being greater than empty,
         close the first switch, and
         cause the power line to be electrically connected to the input of the second charger circuit, and
      at a second time after the first time:
         determine that the charge level is above a second threshold, the second threshold being greater than the first threshold but less than full,
         open the first switch, and
         cause the power line to be electrically disconnected from the input of the second charger circuit.

2. The system of claim 1, the electronic device further comprising:
a hardware interface configured to receive external power from a wall outlet; and
a second switch having a first terminal connected to the hardware interface and a second terminal connected to the input of the second charger circuit, wherein the hardware interface and the input of the second charger circuit are electrically connected when the second switch is closed, and where the controller is further configured to:
at the first time:
   determine that external power is not being received via the hardware interface, and
   open the second switch,
at a third time after the second time:
   determine that external power is being received via the hardware interface,
   close the first switch,
   close the second switch, and
   cause the hardware interface to be electrically connected to the input of the second charger circuit.

3. The system of claim 2, wherein:
the first charger circuit is configured to:
   determine that the connector is not connected to the electronic device; and
   disconnect the supplemental battery from the power line in response to determining that the connector is not connected to the electronic device.

4. The system of claim 1, wherein:
the detection circuit is configured to output a first threshold event signal in response to the charge level of the device battery is below the first threshold, the controller to receive the first threshold event signal as a first hardware interrupt, and
the detection circuit is configured to output a second threshold event signal in response to the charge level of the device battery being above the second threshold, the controller receiving the second threshold event signal as a second hardware interrupt,
wherein:
   after receiving the first hardware interrupt, the controller sets a first interrupt mask so as to ignore subsequent occurrences of the first interrupt that occur before the controller receives the second hardware interrupt, and
   after receiving the second hardware interrupt, the controller sets a second interrupt mask so as to ignore subsequent occurrences of the second hardware interrupt that occur before the controller receives the first hardware interrupt.

5. A system, comprising:
a first battery;
a detection circuit configured to determine a charge level of the first battery;
a controller; and
a second battery,
wherein:
   the controller is configured to charge the first battery using the second battery based at least in part on the charge level being less than a first threshold, and to continue charging the first battery using the second battery until the charge level reaches or exceeds a second threshold that is greater than the first threshold,
   the detection circuit is configured to output a first threshold event signal in response to the charge level being less than the first threshold,
   the detection circuit is further configured to output a second threshold event signal in response to the charge level reaching or exceeding the second threshold, and the controller is further configured to, in response to receiving a first hardware interrupt signal corresponding to the first threshold event signal, set a first indicator to mask subsequent occurrences of the first hardware interrupt signal that occur before the controller receives a second hardware interrupt signal corresponding to the second threshold event signal.

6. The system of claim 5, wherein an upper limit of a range of the charge level corresponds to the first battery being fully charged, and the second threshold is less than the upper limit.

7. The system of claim 5, further comprising:
a first charger circuit coupled to the first battery;
a second charger circuit coupled to the second battery; and
an interface to receive electrical energy from outside the system,
wherein, in response to receiving electrical energy via the interface, the controller:
  directs a first portion of the electrical energy to the first charger circuit to charge the first battery, and
  directs a second portion of the electrical energy to the second charger circuit to charge the second battery.

8. The system of claim 5, further comprising a connector via which electrical energy is transferred from the second battery to the first battery, wherein in response to the charge level reaching or exceeding the second threshold, the controller causes the second battery to be electrically disconnected from the connector.

9. The system of claim 8, wherein:
the connector comprises a ground connection, a power control connection, and a power connection,
the electrical energy is transferred from the second battery to the first battery via the power connection, and
the second battery is electrically disconnected from the power connection based on signaling over the power control connection.

10. The system of claim 9, further comprising:
a resistor connecting the ground connection to the power control connection; and
a switch having a first terminal connected to the power control connection, and a second terminal connected to a voltage potential from the first battery,
wherein the controller closes the switch to increase to a voltage level on the power control connection, to cause the electrical energy to be transferred from the second battery to the first battery.

11. The system of claim 5, wherein the controller is further configured to clear the first indicator in response to receiving the second hardware interrupt signal.

12. The system of claim 11, wherein the controller is further configured to:
in response to receiving the second hardware interrupt signal, set a second indicator to mask subsequent occurrences of the second hardware interrupt signal that occur before the controller receives another first hardware interrupt signal; and
clear the second indicator in response to receiving the another first hardware interrupt signal.

13. The system of claim 12, wherein
the controller is further configured to:
  set the first indicator by setting a first interrupt mask register associated with the controller,
  clear the first indicator by clearing the first interrupt mask register,
  set the second indicator by setting a second interrupt mask register associated with the controller, and
  clear the second indicator by clearing the second interrupt mask register.

14. A method comprising:
detecting a charge level of a first battery;
causing charging of the first battery using a second battery based at least in part on the charge level being less than a first threshold, the first threshold greater than empty;
stopping charging of the first battery using the second battery, based at least in part on the charge level being at or above a second threshold that is greater than the first threshold;
receiving a first threshold event signal in response to the charge level being less than the first threshold;
receiving a second threshold event signal in response to the charge level being greater than or equal to the second threshold;
in response to receiving a first hardware interrupt signal corresponding to the first threshold event signal, setting a first indicator to mask subsequent occurrences of the first hardware interrupt signal that occur prior to receiving a second hardware interrupt signal corresponding to the second threshold event signal.

15. The method of claim 14, wherein an upper limit of a range of the charge level corresponds to the first battery being fully charged, and the second threshold is less than the upper limit.

16. The method of claim 14, further comprising:
receiving electrical energy from a source other than the first battery and the second battery;
charging the first battery using a first portion of the electrical energy; and
charging the second battery using a second portion of the electrical energy.

17. The method of claim 14, further comprising:
electrically disconnecting the second battery from the first battery, in response to the charge level reaching or exceeding the second threshold.

18. The method of claim 14, wherein causing the charging of the first battery comprises closing a first switch electrically connected between the second battery and a charging circuit of the first battery, and stopping charging of the first battery comprises opening the first switch.

19. The method of claim 18, further comprising:
connecting a signaling line to a voltage potential from the first battery to increase a voltage level on the signaling line, the increase of the voltage level causing the second battery to be electrically connected to the first switch, wherein the signaling line is also connected to a ground potential of the first battery via a resistor.

20. The method of claim 14, further comprising:
clearing the first indicator in response to receiving the second hardware interrupt signal.

21. The method of claim 20, further comprising:
in response to receiving the second hardware interrupt signal, setting a second indicator to mask subsequent occurrences of the second hardware interrupt signal that occur prior to receiving another first hardware interrupt signal; and
clearing the second indicator in response to receiving the another first hardware interrupt signal.

22. The method of claim 21, wherein:
setting the first indicator comprises setting a first interrupt mask register associated with a processor, and
clearing the first indicator comprises clearing the first interrupt mask register, setting the second indicator comprises setting a second interrupt mask register associated with the processor, and clearing the second indicator comprises clearing the second interrupt mask register.

* * * * *